US006318399B1

(12) United States Patent
Backham et al.

(10) Patent No.: US 6,318,399 B1
(45) Date of Patent: Nov. 20, 2001

(54) LATCH MECHANISM

(76) Inventors: Michael Buller Backham, 3 Hillside Avenue, Canterbury, Kent CT2 8ET; Lee Stoddart, 39 Linksfield Road, Westgate-On-Sea, Margate, Kent CT8 8EX; Peter Bartingale, Bartingale Design Associates Ltd., The Studio, Margate, Kent CT9 1EG, all of (GB)

( * ) Notice: Subject to any disclaimer, the term of this patent is extended or adjusted under 35 U.S.C. 154(b) by 0 days.

(21) Appl. No.: 09/534,770

(22) Filed: Mar. 24, 2000

(51) Int. Cl.[7] .......... F16K 17/40
(52) U.S. Cl. .......... 137/79; 137/601; 454/369
(58) Field of Search .......... 137/79, 601; 454/369

(56) References Cited

U.S. PATENT DOCUMENTS

| | | | | |
|---|---|---|---|---|
| 4,080,978 | * | 3/1978 | McCabe | 137/79 |
| 4,555,981 | * | 12/1985 | McCabe | 454/369 |
| 5,533,929 | * | 7/1996 | Attridge, Jr. | 454/369 |
| 5,779,540 | * | 7/1998 | Nailor | 454/369 |
| 6,039,030 | * | 3/2000 | Robinson et al. | 123/457 |

* cited by examiner

*Primary Examiner*—A. Michael Chambers
(74) *Attorney, Agent, or Firm*—Akin, Gump, Strauss, Hauer & Feld, L.L.P.

(57) ABSTRACT

A fluid damper in a ventilation duct serves to close the duct in the event of a fire so as to damp the flow of air in the duct. The damper comprises a retractable curtain that is normally retained in a retracted configuration by a latch mechanism attached to a frame of a fluid damper. The latch mechanism comprises a housing having at least one latch member biased so as to project from the housing and movable between a position in which it engages an end blade of the curtain so as to hold it in a retracted position and a position in which it is clear of the curtain so as to release it from the retracted position. The latch mechanism is held in the curtain retaining position by a releasable locking catch that is operatively coupled to a thermally sensitive element such that when the element reaches a pre-determined temperature it expands so as to release the locking catch and thereby allow the latch member to release the curtain. The latch member retractable within the housing so as to permit resetting of the curtain to the retracted position.

7 Claims, 3 Drawing Sheets

LATCH MECHANISM

This invention relates to a latch mechanism for attachment to a frame of a fluid damper such as, in particular a fire or smoke shield of a ventilation system.

Fire or smoke shields used in normal dry filtered air ventilation systems generally comprise a support frame that is received in a duct of the ventilation system and a retractable curtain that is reversibly extensible between a retracted position in which the duct is open and an extended position in which the curtain closes and seals against the frame so as to damp the flow of air in the duct aid thereby hinder the progress of the fire.

Our UK patent Nos. GB 2180745, GB 2224440 and GB2223676 describe a latch mechanism that is mounted on the support frame of a fire shield, The shield comprises a multiple-blade folding curtain fire damper that, in use, is normally retracted within the support frame so as to leave the duct open. The latch has jaws that are adapted to engage a bottom edge of the curtain so as to hold it in the retracted position and includes a fusible element that melts at a predetermined temperature so as to release the jaws (and therefore the curtain) to effect closing of the duct in the event of a fire. The latch is provided with a dual fail-safe arrangement with a thermal link in the form of memory metal springs that expand at said pre-determined temperature so as to release the latch jaws.

It is important that fire shields of the kind described above are inspected and tested at regular intervals to ensure that they perform properly in the event of a fire. To reach the shield and the latch mechanism it is usual for an inspection hatch to be provided in one of the ducts adjacent the shield so that a technician can gain access to the curtain and the latch mechanism. In our aforementioned patents there is described a latch mechanism with a manually operable release mechanism that allows the technician to test operation of the latch mechanism and movement of the curtain to the extended position. There is also described a removable mounting mechanism that allows the latch to be removed and fitted with a replacement fusible element, if necessary. After inspection and/or servicing of the fire shield it is necessary for the technician to reset the curtain in the retracted position. This is often a difficult operation, as the curtain has to be held in the retracted position until the latch can be reset. It is made more difficult by the construction of the mechanism as it is easy for the technician to inadvertently reset the latch before the curtain is fully retracted by causing the curtain blades to brush against the jaws of the latch mechanism.

It is an object of the present invention to obviate or mitigate the aforementioned problems of disadvantages.

According to a first aspect of the present invention, there is provided a latch mechanism for attachment to a frame of a fluid damper, the mechanism comprising a housing having at least one latch member biased so as to project from the housing and movable between a first position in which it engages a barrier of the damper so as to hold it in a retracted position and a second position in which it is clear of the barrier so as to release the barrier from the retracted position characterised in that the at least one latch member is held in said first position by a releasable locking member, the locking member being operatively coupled to a thermally sensitive element such that when the thermally sensitive element reaches a pre-determined temperature it changes shape or state so as to release the locking member thereby allowing the latch member to move to the second position, and in that the latch member is movable against the bias to a third position in which it is retracted into the housing so as to permit movement of the barrier to the retracted position.

This arrangement simplifies the resetting procedure after the curtain has been released since the latch member is able to retract should the barrier come into contact with it as it is moved back to the retracted position.

Preferably the latch member is pivotable between first and second positions about a pin.

The locking member may be held in the unreleased state by a locking pin that engages with the locking member and is acted on by the thermally sensitive element.

The locking member may be released by virtue of expansion of the thermally sensitive element at said predetermined temperature causing the locking pin to move out of engagement with locking member. The thermally sensitive element may be disposed between a fixed wall of said housing and a support member that is fixed to said pin and may be moveable relative to the housing.

The thermally sensitive element may be a coil of memory metal that expands when reaching said predetermined temperature. However it may alternatively be constructed of shape memory alloy that changes shape upon reaching the predetermined temperature or any fusible element that melts at said predetermined temperature.

The locking member is preferably pivotally disposed in said housing pivots to released state.

According to a second aspect of the present there is provided a fluid damper comprising a retractable barrier for closing a duct and a latch mechanism as defined above. The barrier may take any suitable form but in a preferred embodiment it is a foldable curtain comprised of multiple pivotally connected blades.

A specific embodiment of the invention will now be described, by way of example, with reference to the accompanying drawings, in which.

Figure 2:
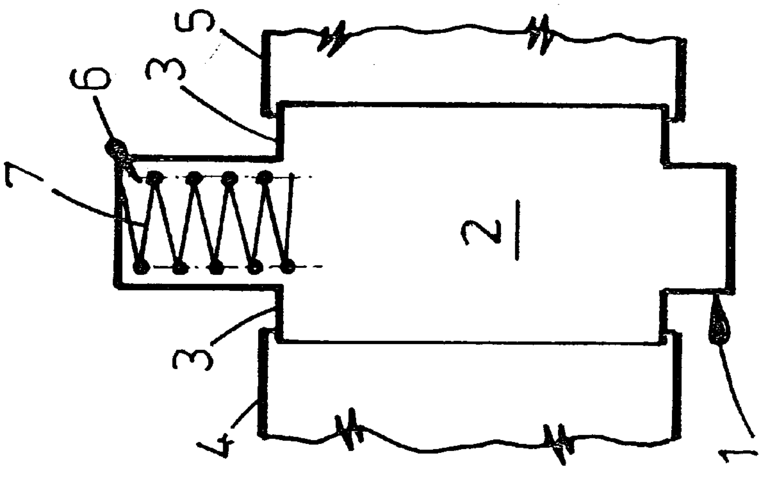
FIG. 2 is a diagrammatic section through the damper assembly of FIG. 1 showing the curtain in a retracted position.
Figure 1:
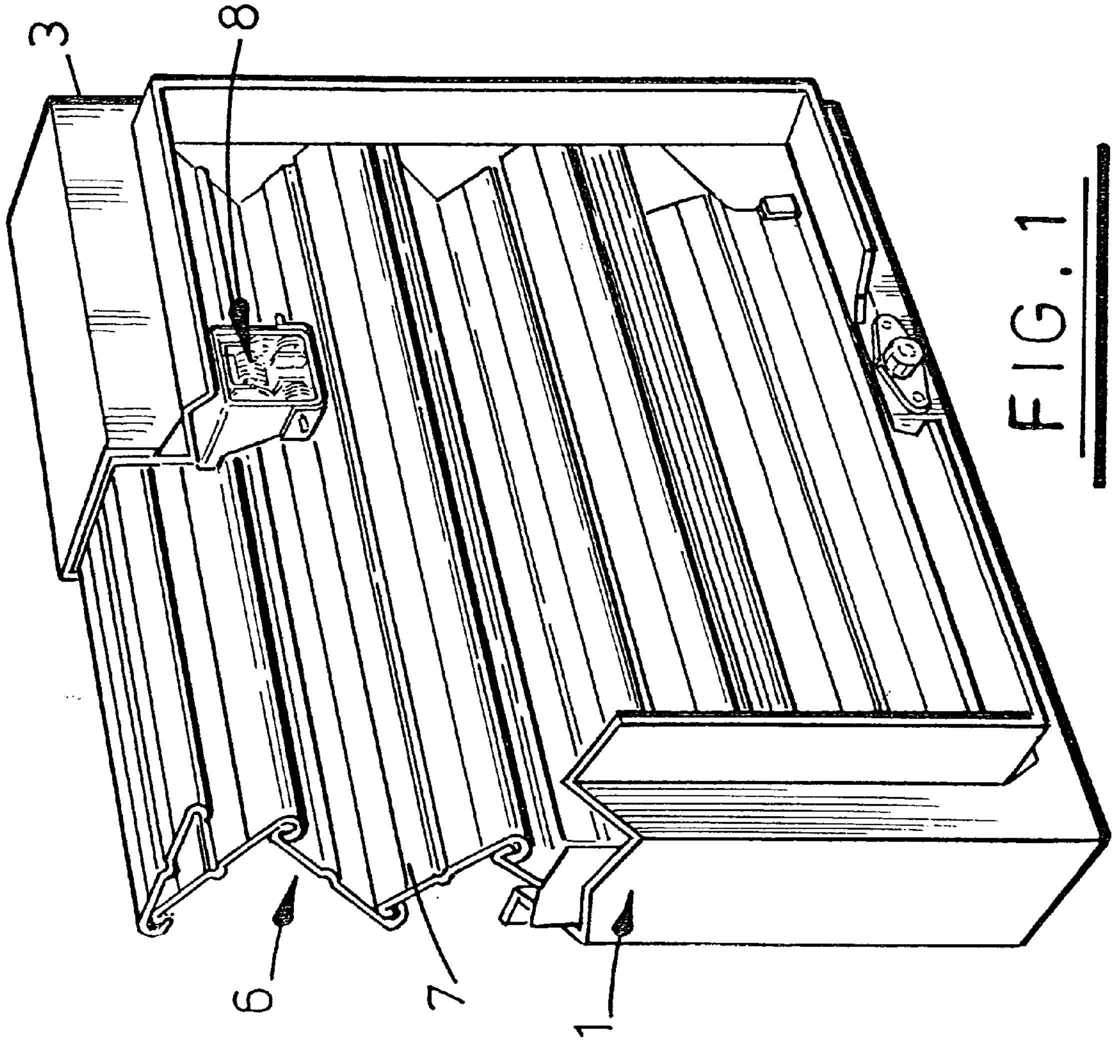
FIG. 1 is a perspective view of a fire damper assembly with a curtain and a known latch mechanism.
Figure 4:
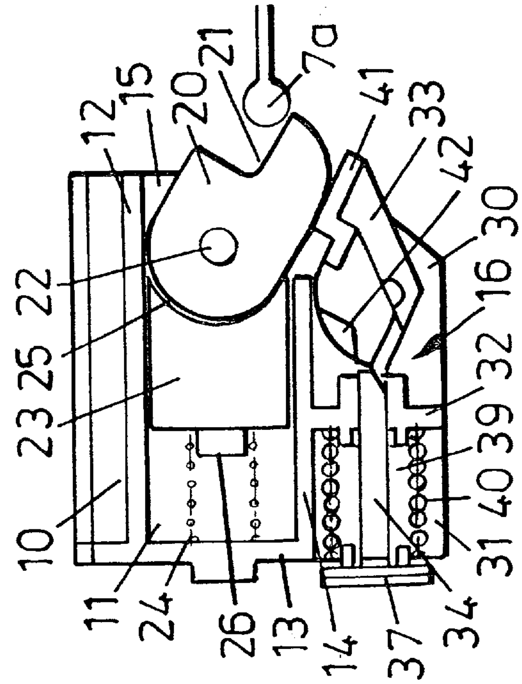
FIG. 4 is a sectioned side view of the latch mechanism of FIG. 3, shown with the latch member in a released position.

Referring now to the drawings, the exemplary fire damper shown in FIGS. 1 and 2 comprises a support frame 1 defining an opening 2 and having a projecting flange 3 on each side that enables the damper to be fitted co-axially to respective ducts 4, 5 of, for example, a ventilation system (not shown).

The damper has a retractable metal curtain 6 composed of a plurality of pivotally connected blades or strips 7 acted upon by a strong spring (not shown) that biases the curtain into the extended configuration shown in FIG. 1. In normal use the curtain 6 is held in a folded-up retracted position by a latch mechanism 8 that is mounted on the flange 3. The latch mechanism 8 shown in FIG. 1 is of known construction but is directly replaceable by the latch mechanism of the present invention that is described in detail below. In the retracted position depicted in FIG. 2 the curtain 6 allows the free flow of air or other fluid through the ducts 4, 5. In the event of a fire the latch 8 is actuated by heat sensitive means (described below) so as to release the curtain 6 and allow it to unfold, under the influence of the strong spring, to an extended position in which it closes the opening 2 through the damper (as depicted in FIG. 1).

Referring now to FIGS. 3 to 7 of the drawings, the latch mechanism 8 of the present invention has a housing 10 with parallel side walls 11 and a transverse upper wall 12 so as to define an inverted U-section. The housing 10 also has a vertical rear wall 13 and an intermediate horizontal wall 14 which extends in parallel to the upper wall 12 and divides the U-section into upper and lower portions 15, 16. The upper portion 15 of the U-section carries a latch member 20 that has a jaw 21 that serves to hold the curtain 6 in the retracted position. The latch member 20 is pivotally disposed in the housing on a transverse pin 22 so that it may pivot between the positions shown in FIGS. 3 and 4. In addition, the latch member 20 is slidable into and out of the housing 10 between the positions shown in FIGS. 3 and 7 by virtue of the pin 22 being engaged in slots (not shown) provided in the side walls 11 of the housing 10. At the rear of the latch member 20 there is provided a plunger 23 that is biased to the position shown in FIGS. 3 and 4 by a compression spring 24. The plunger 23 has a front arcuate surface 25 that permits the pivotal movement of the latch member 20 and has a spigot 26 at the rear on which the compression spring 24 is mounted. The compression spring 24 acts between the rear wall 13 of the housing 10 and the rear of the plunger 23 so as to bias the latch member 20 such that the jaw 21 projects out or the housing 11.

The lower portion 16 of the housing 10 is divided into front 30 and rear sections 31 by an intermediate vertical wall 32. The front section 30 caries a pivotal locking catch 33 disposed below the latch member 20 and the rear section 31 carries a locking pin 34 that extends through an aperture 35 in the intermediate vertical wall 32. The locking pin 34 is normally engaged with the locking catch 33 so as to prevent its rotational motion and is carried in a sliding support member 36 that is slidably disposed in the rear section 31. The support member 36 has rear and side walls 37, 38 that define a cavity 39 in which a coil of thermally sensitive memory metal 40 is received coaxially about the locking pin 34 and extends between the rear wall 37 of the slidable support member 36 and the intermediate parallel vertical wall 32 of the housing 10.

Figure 3:
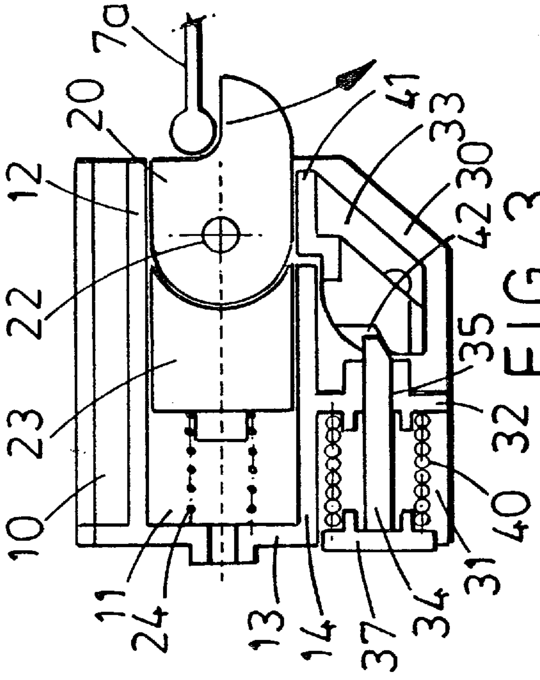
FIG. 3 is a sectioned side view of the latch mechanism of FIG. 1, shown with a latch member of the mechanism holding the curtain in a retracted position.
Figure 5:
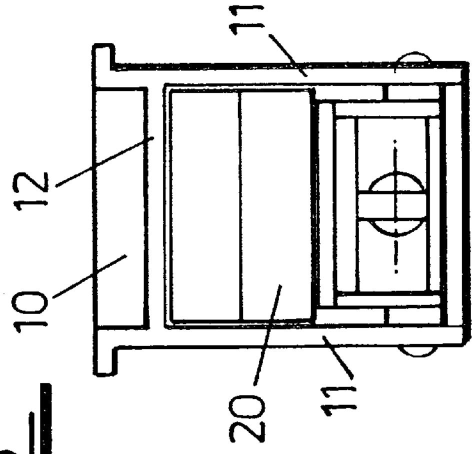
FIG. 5 is a front view of the latch mechanism of FIG. 3.
Figure 7:
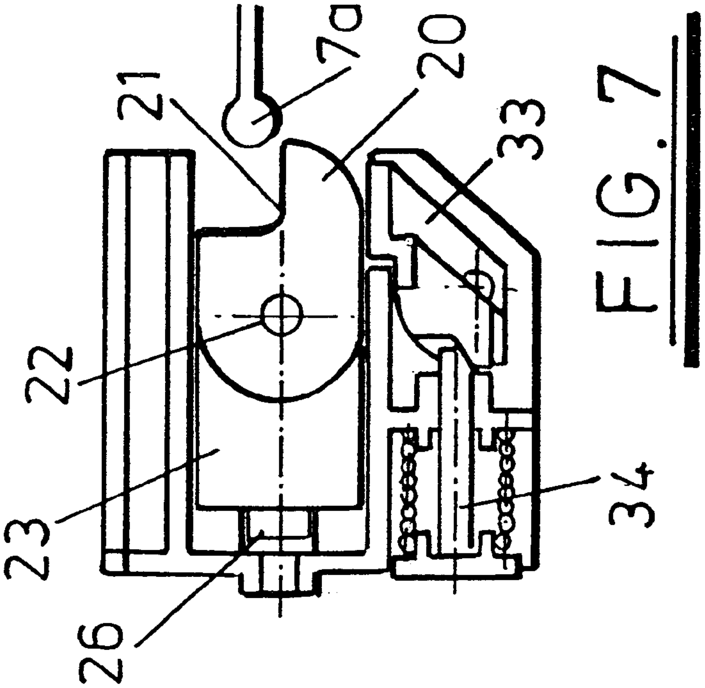
FIG. 7 is a sectioned side view of the latch mechanism of FIG. 3, shown with the latch member in a retracted position.
Figure 6:
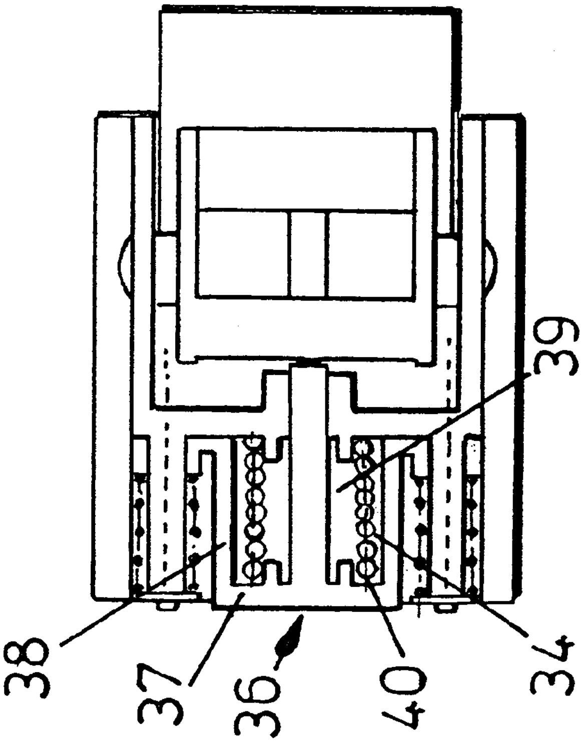
FIG. 6 is an underneath plan view of the latch mechanism of FIG. 3.

The locking catch 33 has an upper planar surface 41 that abuts the latch member 20 so as to prevent it pivoting about the transverse pin 22 and at the rear it has a recess 42 in which an end of the locking pin 34 is received as shown in FIG. 3 so as to prevent the pivotal movement as referred to above.

In operation, the latch mechanism 8 is normally set to the configuration shown in FIG. 3 in which the lowermost blade 7*a* of the curtain 6 is received in the jaw 21 of the latch member 20 so as to hold the curtain 6 in the retracted position shown in FIG. 2. In this configuration the latch member 20 is biased to project out of the housing 10 by the combination of the compression spring 24 and the plunge: 23 and is held against rotation about pin 22 by the locking catch 33 which itself is held in the position shown by the locking pin 34 and support member 36. In this configuration the coil of memory metal 40 is of a size such that it is retained in the cavity 39 without being placed under compression.

In the event of a fire, when the temperature in the vicinity of the latch mechanism 8 reaches a pre-determined value the coil of memory metal 40 expands so as to force retraction of the locking pin 34. This action releases the locking catch 33 and the latch member 20 is free to pivot about the pin 22 under the influence of the spring biased curtain. In this position, shown in FIG. 4, the curtain 6 is released from the jaw 21 and allowed to extend so as to close the duct.

When it is necessary to reset the latch mechanism 8, for example during testing or after a fire (the coil of memory metal having been replaced), there are two ways in which this can be achieved. One way is to move the curtain 6 manually upwards to the retracted position and then set the locking catch 33 by pivoting it (and therefore the latch member 20) to the position shown in FIG. 3. Alternatively, the locking catch 33 may first be reset and then curtain 6 is moved manually upwards past the latch mechanism 8 to the retracted position. As the blades 7 of the curtain 6 pass the latch member 20 they abut its foremost surface and force it to retract against the bias of the compression spring 26.

The memory metal is typically re-usable, provided its temperature has not exceeded 180° C. as it returns to its original shape on cooling.

The latch mechanism 8 may be provided with other release mechanisms for test purposes. For example, there may be provided an electromagnet release facility for remote operation or a manually operable finger release mechanism.

It is to be understood that numerous modifications to the above described design may be made without departing from the scope of the invention as defined in the claims. For example, the coil of memory metal may be replaced with a fusible element such as an appropriate eutectic solder that changes state (solid to liquid) when it reaches a predetermined temperature.

What is claimed is:

1. A latch mechanism for a fluid damper comprising:

a frame defining a flow passageway;

a curtain barrier which is displaceable along a predetermined path extending across the flow passage between a damper open position in which the barrier is retracted to one side of the flow passage and a damper closed position in which the barrier extends across and obstructs the flow passage; and a mechanism for biasing the barrier from the damper open position to the damper closed position, wherein the mechanism comprises, a housing for attachment to the damper frame and at least one latch member biased so as to project from the housing, the latch member being moveable relative to the housing between a first position in which it projects across the predetermined path so as to enable retention of the barrier in the damper open position and a second position in which it does not project across the predetermined path so as to enable extension of the barrier to the damper closed position; and a releasable locking member arranged to engage the at least one latch member to prevent the displacement of the latch member from the first to the second position, the locking member being operatively coupled to a thermally sensitive element such that when the thermally sensitive element reaches a predetermined temperature it changes shape or state so as to release the locking member thereby allowing the latch member to move to the second position, and the latch member being retractable into the housing from the first position to a third position against the bias which causes it to project from the housing despite engagement of the locking member with the latch member.

2. A latch mechanism according to claim 1, wherein the latch member is pivotable about a pin between first and second positions.

3. A latch mechanism according to claim 1 or 2, wherein the locking member is held in the unreleased state by a locking pin that engages with the locking member and is acted on by the thermally sensitive element.

4. A latch mechanism according to claim 3, wherein the locking member is released by virtue of expansion of the thermally sensitive element at said pre-determined temperature causing the locking pin to move out of engagement with locking member.

5. A latch mechanism according to claim 1, wherein the thermally sensitive element is disposed between a fixed wall of said housing and a support member that is fixed to said pin and is moveable relative to the housing.

6. A latch mechanism according to claim 1 wherein the thermally sensitive element is a coil of memory metal or shape memory alloy that expands when reaching said pre-determined temperature.

7. A latch mechanism according to claim 1, wherein the locking member is pivotally disposed in said housing so as to move between the released and unreleased states.

* * * * *